(12) United States Patent
House (10) Patent No.: US 7,140,873 B1  
(45) Date of Patent: Nov. 28, 2006

(54) MULTI ALL FUEL PROCESSOR SYSTEM AND METHOD OF PRETREATMENT FOR ALL COMBUSTION DEVICES

(75) Inventor: Michael J. House, 16181 Softwater Lk. Dr., Linden, MI (US) 48451

(73) Assignee: Michael J. House, Linden, MI (US)

( * ) Notice: Subject to any disclaimer, the term of this patent is extended or adjusted under 35 U.S.C. 154(b) by 0 days.

(21) Appl. No.: 09/259,593

(22) Filed: Mar. 1, 1999

(51) Int. Cl.
*F23N 1/02* (2006.01)

(52) U.S. Cl. .................. 431/11; 431/41; 219/628; 123/557

(58) Field of Classification Search ............... 431/208, 431/11, 12, 41, 36; 219/628, 629, 635, 202, 219/205; 123/557, 558, 549
See application file for complete search history.

(56) References Cited

U.S. PATENT DOCUMENTS

| | | | | |
|---|---|---|---|---|
| 2,197,904 A | * | 4/1940 | Terry | 431/12 |
| 3,589,314 A | * | 6/1971 | Tratz et al. | 431/208 |
| 3,647,347 A | * | 3/1972 | Shakiba | 431/41 |
| 3,653,794 A | * | 4/1972 | Shakiba | 431/208 |
| 3,925,002 A | * | 12/1975 | Verdouw | 431/11 |
| 3,932,137 A | * | 1/1976 | Culpepper, Jr. | 431/12 |
| 3,975,139 A | * | 8/1976 | Arroyo-Garcia | 431/208 |
| 4,095,933 A | * | 6/1978 | Schumacher | 431/11 |
| 4,406,943 A | * | 9/1983 | Wilkinson | 431/208 |
| 4,447,245 A | * | 5/1984 | Smith et al. | 44/595 |
| 4,606,320 A | * | 8/1986 | McGee | 123/557 |
| 4,862,858 A | * | 9/1989 | Goldsberry | 123/557 |
| 4,877,395 A | * | 10/1989 | Schubach et al. | 431/208 |
| 5,149,260 A | * | 9/1992 | Foust | 431/11 |
| 5,201,341 A | * | 4/1993 | Saito et al. | 123/557 |
| 5,386,813 A | * | 2/1995 | LeBlanc | 123/557 |
| 5,400,969 A | * | 3/1995 | Keene | 219/205 |
| 5,474,442 A | * | 12/1995 | Gertsmann et al. | 431/119 |
| 6,881,056 B1 | * | 4/2005 | Simonds | 431/168 |
| 2005/0160717 A1 | * | 7/2005 | Sprouse et al. | 60/39.821 |

* cited by examiner

*Primary Examiner*—S. Gravini (57) ABSTRACT

A processor system and method for pretreating ALL FUELS prior to combustion of a any combustion device such as an engine in which fuel in a liquid state is contained in a high pressure chamber and superheated to a state of elevated temperature and pressure.super heated fuel is then injected into the combustion chamber for burning as demanded by the combustion device. This process holds true for ALL FUELS, Liquids, Gaseous, Pulverized Solids and Solids. Making it an Ideal UNIVERSAL self contained process that can be adapted to existing needs as well as new needs for total energy use. This Process will allow ALL FUELS to burn more cleanly and efficiently and will promote optimum combustion.

7 Claims, 1 Drawing Sheet

FIG. 1

MULTI ALL FUEL PROCESSOR SYSTEM AND METHOD OF PRETREATMENT FOR ALL COMBUSTION DEVICES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

This invention concerns a new and useful process that involves the burning of any combustible fuels: liquid, gaseous, and solids; such as gasoline, diesel, kerosene, alcohol, natural gas, coal, medical waste, hazardous waste, and/or any fuel medium, to generate mechanical or heat energy. This new process is useful for any fuel, natural or man made, etc. Thus, it may increase the efficiency of all fuels, while reducing emissions of fuels being processed prior to combustion with this new process, thus to eliminate pollution of land, air, and water, and preserve energy.

2. Description of the Prior Art

The efficiency developed by combustion devices such as engines, boilers, or any device depends, to a large degree, on the completeness of combustion for any fuel. Emissions, also, will increase or decrease to a great extent to the degree when complete combustion occurs.

Accordingly, considerable efforts have been exerted towards improving the efficiency of gasoline fuel in engines and some other combustion devices, such as boilers. These other efforts seem to be very limited in their applications.

Through patent research, I cannot find an invention of this like. This invention, that I have created, is a very truly needed and a new and useful process. My invention is especially unique in the fact that this same new process is intended for all fuels. My claims are specific and clear cut, in that, this process is intended for use of all fuels: solid, liquid, and gaseous, which no other invention claims.

The present invention seeks to provide a new process in such a way as to further enhance combustion of all fuels, making this a truly universal new process that can be adapted to all combustion mediums, new and old.

DETAILED DESCRIPTION

In the following detailed description, certain technology will be employed for the sake of clarity and a particular embodiment described in accordance with the requirements of 35 USC 112, but to be understood that the same is not intended to be limiting, inasmuch as the invention is capable of taking many forms and variations within the scope of the appended claims.

Figure 1:
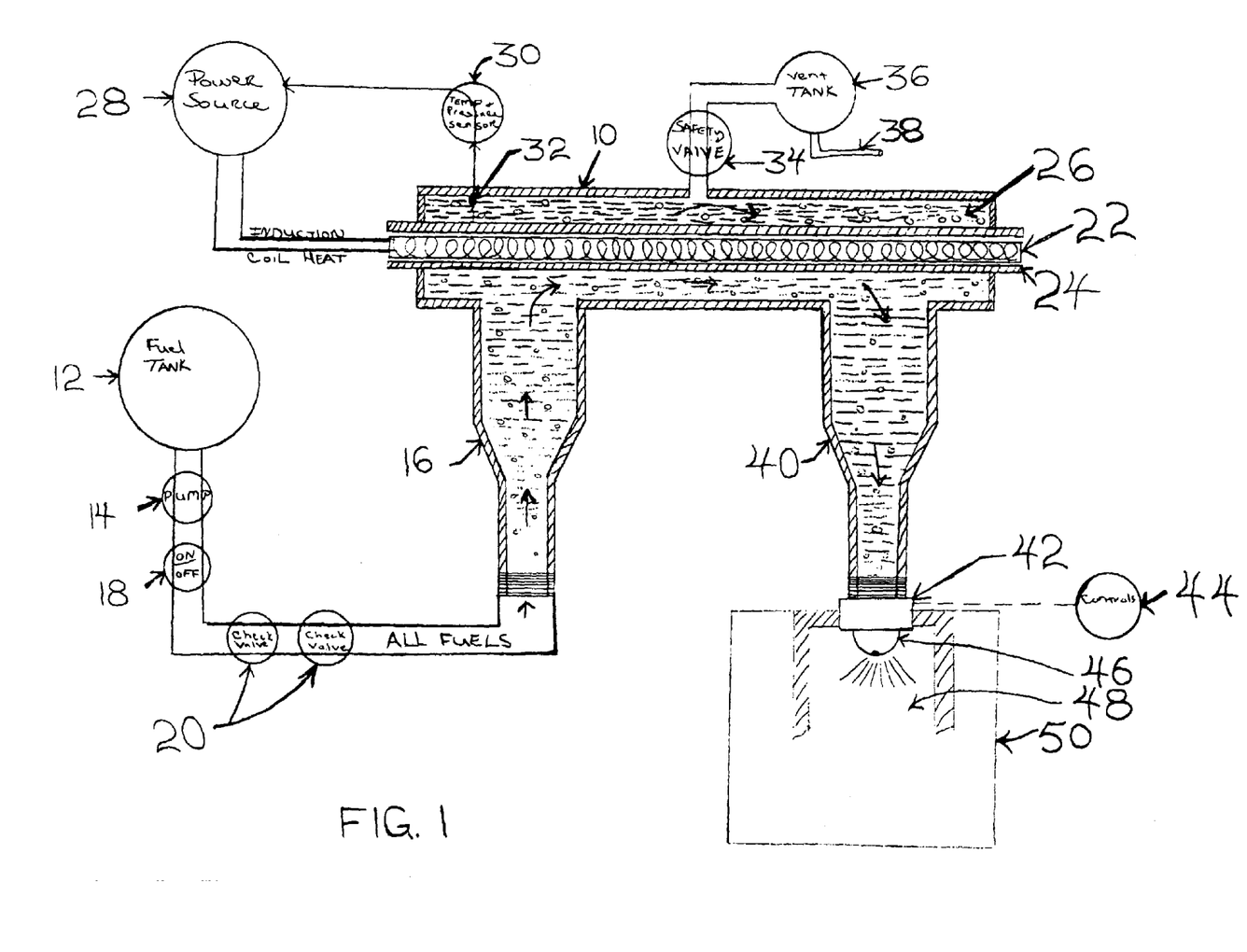
FIG. 1 is a plan view of the device used to carry out the invention process referred to as "Multi All Fuel Processor and Pre-treatment for all Combustion Devices"

Referring to the FIG. 1, the present invention involves a processing system for super preheating of any fuel prior to burning in a combustion chamber (48) or a combustion device (50).

The superheating is carried out in a heavy walled, high pressure, and high temperature tubular enclosure (10). Fuel from a storage tank (12) is directed, under pressure, to an inlet fitting (16) by operation of a pump (14), so as to maintain the high temperature and high pressure chamber (26), defined within the enclosure (10), filled with fuels that are liquids, gaseous, pulverized solids, and solids. Also provided, is a shut-off valve (18) and one or more check valves (20), able to withstand high temperature and high pressure on the order of several hundred degrees and pounds per square inch, or unlimited. The pump (14), also, must be capable of developing such pressures as to enable delivery of all fuels into chamber (26) against the high pressure developed therein, by superheating.

A tungsten porcelain electrical resistance induction heating element (22) extends lengthwise within a tubular heater chamber (24), defined within the enclosure (10). All fuels are directed into the annular chamber (26) surrounding the induction heating rod (22) to be heated, thereby, the heater power source (28), controlled by thermostatic controls (30) responsive to a temperature sensor (32) located in chamber (24).

The wattage of the electrical heater rod (22) should enable heating of: any fuel, as high as safely possible; liquid fuels, above their boiling point while under pressure; gaseous fuels, should stay below their auto-ignition point while under pressure; pulverized solids, will also have auto-ignition points to stay below to eliminate spontaneous combustion; and solid fuels. The rate corresponds to the flow demand required by the combustion devices (50) using the super preheating processor system.

A pressure relief valve (34) allows safety pressure relief to a vent holding tank (36), which can communicate with the fuel tank (12) via a return drain line (38). A shield, or insulating panels (not shown) may also optionally be provided as safety measures.

The processed, super heated, and pressurized fuel in annular chamber (26) passes out to an outlet fitting (40) communicating with an open/close injector valve (42), controls (44) determining the duration of the open interval for the demand required by the particular combustion devices. A controlled quantity of processed, super heated, and super pressurized, fuel is injected through a spray nozzle (46) into the combustion chamber (48) of those particular combustion devices (50).

It will be understood that details of the combustion devices (50) are not shown, as these may be conventional, but that suitable air and a good stoichiometric ratio, ignition, and fuel will ordinarily be included.

When working with fuels that require high temperatures and high pressures, the working stress of what materials used to manufacture this process should take a minimum ×10 to 15 percent of the ultimate strength for safety factors.

I have, through testing and development of different fuels, liquids, gaseous and solids, created a process that is universal and capable of processing all fuels because of the extreme temperatures the process requires; burning of hydrocarbons and omissions take place only at high temperatures.

In the testing and development of this process, I have developed principles to be followed, not only for safety factor reasons, but for optimum efficiencies of combustion for whatever fuel you chose to utilize with this process. Included in Appendix 1 of this package, shows a photograph of a test bench that I have created in order to safely open flame test all fuel prior to use in order to establish three physical states of matter: solids; liquids; and gaseous. Of these states, for whatever fuel you choose to use, limits will have to be established for operation, melting points, boiling points, cryogenic points, expansion ratios, flash points, flammable ranges, LEL (lower explosive limits), to lean UEL (upper explosive limits), to rich ignition temperatures how hot a particular fuel needs to run, auto-ignition temperatures for spontaneous combustion, vapor density, specific gravity, and/or any testing that will establish safe limits in which any fuel can be utilized. Also, the use of an instrument called a spectrometer can be used to test molecular structure, weight, formula, and analysis of all fuels prior to use, in establishing safe guide limits prior to use of any fuels.

Appendix 2 photographs that show an example of kerosene fuel in an open flame bench test were performed to establish these types of limits. Notice the photograph of open flame test that is very yellow in appearance. This fuel is an ambient temperature and is not clean. You can see the presence of free carbons, that cause pollution, by their bright yellow color. Now, the other photograph shows the invention process being tested with the same fuel, kerosene, by unlimitedly super heating this fuel. Only, the visual flame can be seen to burn much cleaner and efficiently because this invention process allows for complete combustion to occur, inhibiting free carbons, emissions, and pollutants, thereby increasing efficiencies.

Listed, are Methods for Processing the 3 Physical States of all Fuels:

All fuels will have boiling points and points that are listed on the previous paragraph above, that you need to know prior to processing of any fuel used: solids, liquids, and gaseous. These points will establish safe limits of processing for that particular fuel before use on any application.

Liquid Fuels:

Processing with high temperatures and pressures are very obtainable because the containment device can be made to withstand these internal and external forces, allowing the liquids to be kept under pressure proportional to temperature, and kept from boiling while super heated. Because of lack of oxygen in liquid fuels, the chance of auto-ignitions of spontaneous combustion is virtually eliminated. Frequently, combustion calculations can be simplified by using molecular mass (weight) as the basis for calculations, but calculating and bench testing should be used to establish guides for the particular fuel of use prior to production use of this process on any combustion mediums. If liquid oxygen is added to fuels, auto-ignition temperatures and pressures should be tested. All fuels should try to stride for unlimited temperatures and pressures in this process. Included in Appendix 3 of this package, are examples of some liquid fuels tested in atmospheric pressure, showing the approximate temperature certain fuels can produce. These temperatures can gain even higher through this process while increasing pressure for the optimum combustion of all fuels.

Gaseous Fuels

Processing with high temperature and pressures are very obtainable because the containment device can be made to withstand these internal forces created, but auto-ignition can occur if mixtures of gases or vapors with air or oxygen will explode spontaneously if the temperature is sufficiently high. Auto-ignition temperatures are markedly decreased as the pressure is raised above atmospheric. Minimum auto-ignition temperatures and pressures should be established with safety factors in mind prior to use of any fuel. All fuels should try to stride for unlimited temperatures and pressures in this process. Included in Appendix 4 of this package, are examples of minimum auto-ignition temperatures of fuels in air or oxygen at atmospheric pressures. These temperatures can gain even higher through this process while increasing pressure for the optimum combustion of all fuels.

Solid Fuels

Processing with high temperatures and pressures are very obtainable because the containment device used to carry out this process can be made to withstand these internal and external forces, allowing for ultimate efficiencies. Solid fuels are very similar in processing to those of liquid fuels.

Pulverized Solid Fuels

Processing with high temperature and high pressure are very obtainable because the containment device can be made to withstand these internal and external forces created, but auto-ignition can occur if mixture of gases or vapors with air or oxygen will explode spontaneously if the temperature is sufficiently high, Pulverized solid fuels are very similar in processing to that of gaseous fuels.

Appendix 11 shows physical and chemical properties of methane and gasoline. This process requires testing of whatever fuels you choose to process before processing use, so that safety standard can be established for that application.

BRIEF DESCRIPTION OF THE SEVERAL VIEWS OF THE DRAWINGS AND PHOTOGRAPHS

The file on this patent contains at least one drawing and photograph executed in color. These color drawings and color photographs are necessary to understand the working principles of this process, "Multi All Fuel Processor System and Method of Pre-treatment for Combustion Devices".

Listed, are Appendix, 1 through 12B:

Appendix 1: Test Bench created by inventor, Michael J House
Appendix 2: Test Bench burning Kerosene
Appendix 3: Liquid fuels tested, approximate temperatures fuels obtain
Appendix 4: Gaseous fuels auto-ignition temperatures
Appendix 5: Inventor, Michael J House, holding processor
Appendix 6: Inventor holding actual device used in process
Appendix 7: Color drawings, 7/28/96, to carry out process
Appendix 8: Color drawings, 4/26/93, to carry out process
Appendix 9: Color drawings, 12/17/88, to carry out process
Appendix 10: Color drawings, 12/17/88, to carry out process
Appendix 11: Physical and chemical properties for methane and gasoline
Appendix 12A: Actual invention process installed on an automobile engine test vehicle made by inventor, Michael J House
Appendix 12B: Actual test vehicle using invention process

APPENDIX 1

Test Bench Created By Inventor: Michael J. House
OPEN flame Testing of All Fuels.

All fuels ARE Tested Prior to use; so that Temperatures AND Pressures CAN Be Established.

APPENDIX 2

Flame test above shows Kerosene fuel without Process, Notice unburn carbon that Emit yellow flame.

Flame Test below shows Kerosene fuel with Process, Notice the cleaner flame by Processing the fuel Prior to Combustion with this Process

APPENDIX 3

Here Listed are considerations in the use of This Process. The Multi All Fuels Processor is capiable of Processing All Fuels as Long as Temp & Press. for what ever fuel you choose to use Are at Their Highest Points with Safety in mind. Listed Are Approximate Temperatures AND Pressures of some fuels, to give and Idea of PRINCIPAL EXAMPles of Liquid fuels. Temperatures AND Pressures Must Correlate Proportionately Rise in Temp. / Rise in Press.

| Fuels Liquid EXAMPles | OXIDIZERS | Pressures (ATM) | Temp. (°K) | Temp. (°F) |
|---|---|---|---|---|
| Acetylene | AIR | 1 | $2600°K$ | $4220°F$ |
| Acetylene | Oxygen | 1 | $3410°K$ | $5678°F$ |
| Carbon Monoxide | AIR | 1 | $2400°K$ | |
| Carbon Monoxide | Oxygen | 1 | $3220°K$ | |
| HEPTANE | AIR | 1 | $2990°K$ | |
| HEPTANE | Oxygen | 1 | $3100°K$ | |
| Hydrogen | AIR | 1 | $2400°K$ | |
| Hydrogen | Oxygen | 1 | $3080°K$ | |
| METHANE | AIR | 1 | $2210°K$ | |
| METHANE | Oxygen | 1 | $3030°K$ | |
| METHANE | Oxygen | 20 | $3460°K$ | |

As you CAN SEE By these SAmples Listed Liquid fuels are Capiable of INfinite Temperatures AND Pressures. Allowing Ultimate Efficiency in Combustion. These Temps. & Press. CAN Increase of Decrease Par Application needed.

APPENDIX 4

MINIMUM AUTO-IGNITION TEMPERATURES AT A TOTAL PRESSURE OF 1 bar. EXAMPLES.

| Combustibles | °F | Ignition Temperatures/°F/K IN AIR °K | IN OXYGEN °K |
|---|---|---|---|
| Methane | 1003.74 | 813 | — |
| Ethane | 958.73 | 788 | 799 |
| Propane | 841.73 | 723 | — |
| Butane | 700.00 | 678 | 556 |
| Iso Butane | 761.00 | 733 | 592 |
| Pentane | 859.72 | 533 | 531 |
| Hexane | 436.73 | 498 | 498 |
| n-Heptane | 418.73 | 488 | 482 |
| Octane | 427.73 | 493 | 481 |
| Acetylene |  | 548 | 573 |
| Benzene |  | 833 |  |
| Methanol | 724.00 | 658 |  |
| Ethanol | 680.00 | 638 |  |
| n-Propanol |  | 713 |  |
| Acetaldehyde |  | 738 |  |
| Dimethyl Ether |  | 623 |  |
| Diethyl ether |  | 433 |  |

Auto-Ignition temperatures are markedly decreased as the Pressure is raised above atmospheric. Cool flames are a complication of the Auto-Ignition process which also must be taken into account. These Temperatures AND Pressures can increase or decrease per application need. Allowing ultimate Efficiency in combustion.

APPENDIX 5

Inventor: Michael J. House Holding Actual Device used to carry out process.

Inventor: Michael J. House Holding Actual Device Multi All Fuel Processor System AND Method of Pretreatment for Combustion Devices.

APPENDIX 6

Inventor: Michael J. House Holding Device I HAVE created in order to carry out Process. The Multi All Fuel Processor System AND Method of Pretreatment for Combustion Devices. Notice to Compact size of this Device used to carry out this Process; this Stand Alone Device Can Be installed in Line Prior to combustion in any Applications. This Size can Increase or Decrease Per Application, the Size Shown would go on the Average Automobile.

APPENDIX 10

APPENDIX II
EAMPlES

Physical And Chemical Properties of Methane AND GASoline

| Property | Methane | GAsoline |
|---|---|---|
| Boiling Point (C) | -161.4 | 25-200°C / -77-428°F |
| Density at STP (g/cc) | 6.8×E-4 | 0.74 |
| Specific gravity | 0.55 liquid | 0.74 |
| Heating Values (Below) | | |
| KJ/g | 50 | 44 |
| MJ/l-liquid | 21.5 | 32.2 |
| Octane rating | | |
| Motor | 125-130 | 83-87 |
| Research | 130 | 91-95 |
| Cetane rating | 0.0 | 16-19 |
| Stoichiometric Ratio (by wt.) | 17.3 | 14.9 |
| Flamability limits (Percent by Volume) | 5.3 to 15.0 | — |
| Flame Temperature in Air (C) | 1877°C / 3410.6°F | 2200°C / 3992°F |
| Heat of Vaporization (J/g) | 510 | 300-350 |
| Mini Autoignition Temp. (C) | 538 | 428-500°F / 220-260°C |
| Mini. Burning Velocity (cm/s) | 37 | 33-47 |

APPENDIX 12A

Actual INvention Process Installed on Automobile Engine, Test Vechicle.

Invention Process Control System and fuel Temperatures and fuel Pressures control System

I claim:

1. A process for the pre-treatment of fuels prior to combustion within a multi-chambered combustion device, comprising the steps of:
   a) super pre-heating a fuel within a main chamber of said multi-chambered combustion device utilizing an internal electrical resistance induction element, said element located in a chamber within said multi-chambered combustion device thereby shielded from direct contact with said fuel;
   b) selectively increasing the pressure of said temperature-elevated fuel within said main chamber by controlling the flow of said fuel moving through said multi-chambered combustion device;
   c) keeping said elevated temperature constant within said multi-chambered combustion device utilizing said electrical resistance induction element, so as to further maintain an elevated pressure of said fuel; and
   d) transferring said temperature-elevated fuel into a combustion chamber, said combustion chamber utilizing an electrical discharge element for combustion, said combustion chamber in fluid communication with said main chamber of said multi-chambered combustion device.

2. The process of claim 1 wherein said fuel is selected from the group consisting of liquid fuel, gaseous fuel, solid fuel, and finely pulverized solid fuel.

3. The process of claim 1 wherein said super pre-heating step (a) is carried out in a metal alloy enclosure cable of withstanding a high pressure and a high temperature.

4. The process of claim 1 wherein said selectively increasing the pressure step (b), further comprises the steps of:
   a) withdrawing said fuel from a storage vessel; and
   b) directing said fuel utilizing a pump through an inlet fitting on said multi-chambered combustion device.

5. The process of claim 1 wherein said keeping said elevated temperature constant step (c) is aided by a multitude of check valves on said multi-chambered combustion device.

6. The process of claim 1 wherein said transferring step (d) is achieved by a pump capable of performance at a high pressure and a high temperature.

7. The process of claim 1 wherein a tungsten porcelain electrical resistance induction heating element is responsible for said super pre-heating of said fuel.

* * * * *